May 23, 1933.  C. H. COLVIN  1,910,092
INSTRUMENT COVER GLASS
Filed May 20, 1929
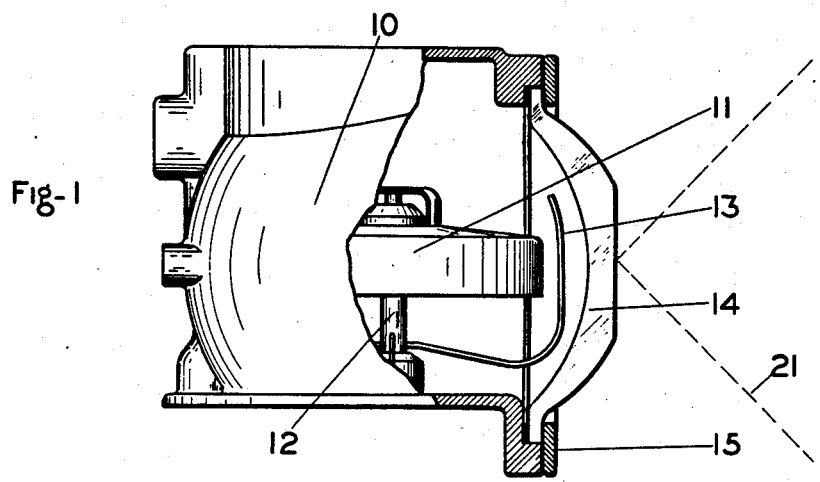
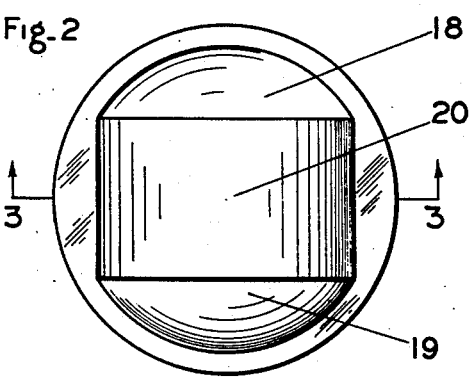
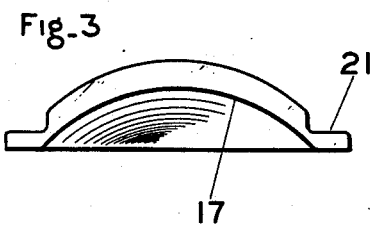
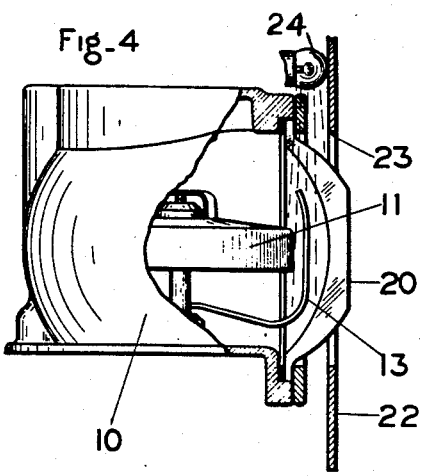
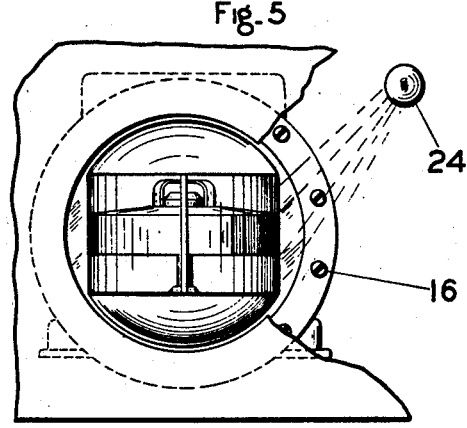
INVENTOR.
CHARLES H. COLVIN
BY
Cooper, Kerr & Dunham
ATTORNEYS.

Patented May 23, 1933

1,910,092

UNITED STATES PATENT OFFICE

CHARLES H. COLVIN, OF BROOKLYN, NEW YORK, ASSIGNOR TO PIONEER INSTRUMENT COMPANY, INCORPORATED, OF BROOKLYN, NEW YORK, A CORPORATION OF NEW YORK

INSTRUMENT COVER-GLASS

Application filed May 20, 1929. Serial No. 364,510.

This invention relates to cover-glasses for instrument housings and more particularly to cover-glasses through which the working parts of instruments are to be observed.

Heretofore, some cover-glasses or lenses which are used to close the open areas of housings, such as compass-bowls, have had convex exterior surfaces. While this type of cover-glass is satisfactory for reading purposes, oftentimes a cover-glass of this type causes difficulty in observing therethrough the working parts of an instrument because the convex outer surface serves as a reflecting surface from which light may reflect into the eyes of an observer. On certain headings, especially when the sun is in the rear of the observer, the reflection is sometimes so pronounced as to make it almost impossible to read the parts of the instruments enclosed behind the cover-glass.

It is, therefore, among the objects of this invention to provide a cover-glass through which the interior of an instrument may be observed without annoyance to an observer because of reflected light.

Another object of the invention is to provide a cover-glass through which the interior of an instrument, such as a liquid compass, may be illuminated from a source of light placed exteriorly of the instrument without enabling reflection of light from the cover-glass into the eyes of an observer.

Other objects and advantages will be pointed out hereinafter in the description and claims.

For the purpose of illustration, I have selected a compass as an example of a type of instrument with which the invention may be advantageously used and it is to be understood that the invention may be used in connection with other types of instruments such as those commonly found on the instrument boards of aircraft.

In the drawing:

Fig. 1 illustrates a side view of a liquid compass with a side wall broken away to show a portion of the interior thereof and the cover-glass in section.

Fig. 2 is a front elevation of the cover-glass.

Fig. 3 is a section of the cover-glass on line 3—3 of Fig. 2.

Fig. 4 is an illustration of a compass-bowl similar to that shown in Fig. 1 and showing its position relative to an instrument board and exterior source of illumination.

Fig. 5 is a front elevation of the liquid compass equipped with the cover-glass and showing the relation of the instrument board and source of illumination illustrated in Fig. 4.

The compass-bowl 10 in the housing has all sides closed except for an open area through which the working parts of the compass are to be observed. The present type of compass is well-known as a liquid compass, a type in which the compass-bowl is filled with a liquid. A compass-card 11 is mounted upon a post 12 and is free to rotate and tilt in any direction, and a lubber's line 13 is provided for facilitating reading of the compass-card.

The open area of the compass-bowl is closed by a cover-glass 14 which is held in place by a cover-glass ring 15 suitably mounted by some such means as screws 16. Though the shape of the open area of the compass-bowl may assume various outlines, it is found convenient to provide an open area having a circular outline. Accordingly, in the form of the invention illustrated in Fig. 2 the cover-glass has a circular outline to accommodate the outline of the open area of the compass-bowl.

The cover-glass illustrated is in the form of a convex lens having an interior concave surface 17, and an exterior surface composed of two convex surfaces 18, 19 and a transverse band 20 which is generated by a line or element moving in a curved path parallel to a directrix. For the purpose of convenience the edge of the cover-glass is in the form of a ring 21 having flat sides by which the cover-glass may be clamped in place by the cover-glass ring 15.

On aircraft it is the usual custom to place the compass on the instrument board either directly in line or nearly in line with the observer's eyes. In this position it is exposed to the sun's rays under certain conditions and whether or not the instrument is being observed, if reflections from the surface of its cover-glass exist, a navigator is continually annoyed. Reflections of this order often render the reading of an instrument painful if not altogether impossible. Cover-glasses having exterior spherical surfaces have been used and, as may be easily understood, owing to the character of the exterior surface, light rays from any source in front of or at the side of the exterior surface would strike an area from which they would be reflected into the eyes of an observer. In taking corrective measures to avoid harassment of this nature I eliminate any spherical exterior surface at the mid-portion of the cover-glass, and cover, as with paint or other suitable covering, the exterior portions 18, 19 above and below the mid-portion 20. This arrangement of exterior surfaces gives a transparent mid-portion 20 which operates as a lens to give lateral magnification to the side of the compass-card and hence to the spacings between vertical direction markings on the compass-card.

As illustrated in the drawing the cover-glass is so mounted in the open area of a compass-bowl as to dispose the elements of the curved surface 20 in substantially a vertical direction.

As may be readily understood, any rays from the sun striking curved surface 20 may not be reflected into the eyes of an observer who is positioned immediately in front of the cover-glass. All such rays would take a path similar to that diagrammatically illustrated at 21 in Fig. 1 and would be reflected downwardly into the cock-pit of the aircraft. Even though the angle of incidence of the light rays 24 be greatly increased over the angle illustrated, the result caused would be the same and the observer would not be annoyed by reflections. Since the convex surfaces 18, 19 are coated with a non-reflecting coating, no trouble is caused by reflection from these surfaces.

A very desired advantage to be had with the use of the present invention is illustrated graphically in Figs. 4 and 5. Owing to the fact that the interior of the compass is filled with liquid the problem of illuminating the compass-card is not an easy one. However, with the type of cover-glass or lens disclosed herein it is possible to illuminate the compass-card from the outside of the instrument without causing reflection of light into the eyes of an observer. For making use of this advantage the compass-bowl 10 is mounted in a position rearward of the instrument board 22 which has a hole 23 cut therein through which the cover-glass may protrude. A source of light 24 is positioned behind the instrument board in such a position that rays of light emitted thereby will fall upon the surface 20 of the cover-glass and illuminate the compass-card 11 and lubber's line 13. No annoyance because of reflection is caused to the observer since the rays of light do not find an area of the surface 20 which is so sloped as to reflect light from the source of light 24 into the eyes of the observer. Since the convex surface 19 is light absorbing, no reflection will be had therefrom. In this particular instance the convex surface 18 has no portion thereof capable of reflecting light from the source of light 24 into the eyes of the observer.

I wish it to be understood that because it is customary to refer to a transparent member closing an open area of a housing as a cover-glass, I have used the term in like manner herein without, however, desiring to limit myself to the kind of material used.

A simple form of cover-glass may consist of an integral element having a plane ring at its periphery by which it may be affixed to a housing and a protruding portion with a cylindrical outer surface flanked by spherical surface portions. Since my invention is subject to variations in form without departure from the nature and principle thereof I do not restrict myself unessentially in the foregoing or other particulars, but contemplate such alterations and modifications within the scope of the appended claims as may be found to be advisable.

I claim:

1. The combination with an instrument having a housing with an open area on one side and working parts to be observed therein, said open area being circular, of a cover-glass closing the open area of said housing, said cover-glass being convex and having a transverse band across the mid-portion of the exterior face of the cover-glass which is generated by a straight line moving in a curved path parallel to the vertical axis of the instrument.

2. The combination with an instrument having a housing with an open area on one side and working parts to be observed therein, of a lens closing the open area of said housing, a said lens being rounded outwardly from the housing and having a transverse band across the mid-portion of its exterior face which is generated by a vertical element moving in a curved path parallel to a directrix, and a covering of non-reflecting material on the outer surface of the spherical portion of said lens whereby reflection of external light is eliminated.

3. The combination with an instrument having a housing with an open area on one side and working parts to be observed therein, of a convex cover-glass closing the open area of said housing and protruding outwardly from the plane of said area, said cover-glass having a horizontally curved surface generated by a line moving parallel to itself and through which the working parts within the housing may be observed, and rounded outer surfaces rendered substantially non-reflecting, and a source of light for illuminating the interior of said housing, said source of light being disposed laterally of the cover-glass and beyond the horizontal plane bounding either the upper or lower limit of the curved surface defined whereby the interior of the housing may be illuminated from said light source without causing reflection into the eyes of an observer observing the working parts within the housing.

4. The combination with an instrument having a housing with an open area on one side and working parts to be observed therein, of a cover-glass carried by the instrument and closing the open area of said housing, said cover-glass being convex and extending beyond the plane of said open area and having a transverse portion in the form of a horizontally curved band generated by the movement of a vertical line parallel to a directrix whereby reflection of external light is eliminated, a panel having an aperture through which the cover-glass may be observed, and illuminating means positioned laterally of the convex portion of said cover-glass whereby light may be directed into the instrument housing.

5. The combination with an instrument panel and an instrument having a housing with an open area on one side and working parts to be observed therein, of a convex cover-glass carried by the instrument and closing the open area of said housing and extending beyond the plane of the open area, said cover-glass having a horizontally curved transverse band across its mid-portion through which the interior of the housing may be seen and substantially non-reflecting spherical portions bordering said mid-portion, illuminating means positioned laterally of the cover-glass and rearwardly of the instrument panel whereby light may be directed through its mid-portion and into the instrument housing, said panel serving as shielding means for preventing illumination forward of the instrument.

6. The combination with an instrument having a housing with an open area on one side and working parts to be observed therein, of means for illuminating the interior of said housing, said illuminating means being disposed outside of said housing and to one side, a cover-glass carried by said housing and closing said open area, said cover-glass being rounded and protruding from the open area of said housing and having a transverse portion in the form of a horizontally curved band, and a blackened non-reflecting surface covering a portion of the outer surface of the cover-glass whereby the transparent area of said cover-glass is restricted.

7. The combination with an instrument having a housing with an open area on one side and working parts to be observed therein, of a cover-glass closing the open area of said housing, said cover-glass having an outer surface with a portion thereof in the form of a horizontally curved band generated by the movement of a vertical line parallel to itself whereby horizontal reflection of light incident on the surface from above the horizontal is eliminated.

8. The combination with an instrument having a housing with an open area on one side and working parts to be observed therein, of a cover-glass closing the open area of said housing, said cover-glass having a transparent horizontally curved mid-portion through which the working parts may be observed, and non-reflecting spherical portions bordering said mid-portion.

In testimony whereof I hereto affix my signature.

CHARLES H. COLVIN.